US009705818B2

(12) United States Patent
Lin et al.

(10) Patent No.: US 9,705,818 B2
(45) Date of Patent: *Jul. 11, 2017

(54) METHOD, APPARATUS, AND SYSTEM FOR ASSIGNING TRIBUTARY PORT NUMBER

(71) Applicant: Huawei Technologies Co., Ltd., Shenzhen, Guangdong (CN)

(72) Inventors: Yi Lin, Shenzhen (CN); Qiuyou Wu, Shenzhen (CN); Fatai Zhang, Shenzhen (CN); Jianrui Han, Shenzhen (CN); Xiaobing Zi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 84 days.

This patent is subject to a terminal disclaimer.

(21) Appl. No.: 14/676,425

(22) Filed: Apr. 1, 2015

(65) Prior Publication Data

US 2015/0207753 A1 Jul. 23, 2015

Related U.S. Application Data

(63) Continuation of application No. 13/435,962, filed on Mar. 30, 2012, now Pat. No. 9,008,511, which is a (Continued)

(30) Foreign Application Priority Data

Sep. 30, 2009 (CN) .......................... 2009 1 0204962

(51) Int. Cl.
*H04J 14/08* (2006.01)
*H04J 3/16* (2006.01)
(Continued)

(52) U.S. Cl.
CPC .......... *H04L 47/724* (2013.01); *H04J 3/1652* (2013.01); *H04J 14/08* (2013.01);
(Continued)

(58) Field of Classification Search
CPC ....................................................... H04J 14/08
See application file for complete search history.

(56) References Cited

U.S. PATENT DOCUMENTS

2002/0176370 A1 11/2002 Ohba et al.
2008/0267223 A1 10/2008 Meagher et al.
(Continued)

FOREIGN PATENT DOCUMENTS

| CN | 1859277 A | 11/2006 |
|---|---|---|
| EP | 1 755 286 A1 | 2/2007 |
| WO | WO 2009/065958 A1 | 5/2009 |

OTHER PUBLICATIONS

Fatal Zhang, et al., "Generalized Multi-Protocol Label Switching (GMPLS) Signaling Extensions for the evolving G.709 Optical Transport Networks Control", Jul. 9, 2010, 22 pages.
(Continued)

*Primary Examiner* — Shi K Li

(57) ABSTRACT

Embodiments of the present invention relate a method, an apparatus, and a system for assigning a tributary port number. The method includes: receiving a service path request message including a service type for establishing a service path used to bear a Lower Order ODU service; determining an OTU link; determining a free tributary slot resource in the OTU link; if a MSI bytes in the OTU link indicates a service type, assigning a tributary port number other than tributary port numbers used by Lower Order ODU services having the same type as the Lower Order ODU service in the OTU link; or if the MSI bytes in the OTU link does not indicate a service type, assigning a tributary port number other than tributary port numbers used by all types of Lower Order ODU services in the OTU link; and sending a service path acknowledgment message to the neighboring node.

14 Claims, 8 Drawing Sheets

Related U.S. Application Data continuation of application No. PCT/CN2010/077416, filed on Sep. 28, 2010.

(51) Int. Cl.
*H04L 12/913* (2013.01)
*H04Q 11/00* (2006.01)

(52) U.S. Cl.
CPC .. *H04Q 11/0066* (2013.01); *H04J 2203/0067* (2013.01); *H04Q 2011/0086* (2013.01)

(56) References Cited

U.S. PATENT DOCUMENTS

| | | |
|---|---|---|
| 2008/0291924 A1 | 11/2008 | Ishii |
| 2009/0190469 A1 | 7/2009 | Kimura |
| 2010/0318661 A1 | 12/2010 | Heurguier |

OTHER PUBLICATIONS

Fatai Zhang, et al., "Generalized Multi-Protocol Label Switching (GMPLS) Signaling Extensions for the evolving G.709 Optical Transport Networks Control", Sep. 22, 2009, 18 pages.

"Interfaces for the Optical Transport Network (OTN)", ITU-T G.709/Y1331, Amendment 3, Apr. 2009, 66 pages.

X. Fu, et al., "Generalized Multi-Protocol Label Switching (GMPLS) Signaling Extensions for G.709 Amendment3 Optical Transport Networks Control", Network Working Group, Jun. 25, 2009, 15 pages.

Aggarwal et al., RFC-5331, "MPLS Upstream Label Assignment and Context-Specific Label Space", IETF, Aug. 2008.

```
+-+-+-+-+-+-+-+-+-+-+-+-+-+-+-+-+-+-+-+-+-+-+-+-+-+-+-+-+
-+-+-+-+
       |OD(T)Uk| T | Res.|    TPN       |     Bit Map       |
       +-+-+-+-+-+-+-+-+-+-+-+-+-+-+-+-+-+-+-+-+-+-+-+-+-+-+
-+-+-+-+
       |                   . . . . . . . .                    |
       +-+-+-+-+-+-+-+-+-+-+-+-+-+-+-+-+-+-+-+-+-+-+-+-+-+-+
-+-+-+-+
```

FIG. 12

```
           0                   1                   2                   3
           0 1 2 3 4 5 6 7 8 9 0 1 2 3 4 5 6 7 8 9 0 1 2 3 4
5 6 7 8 9 0 1
       +-+-+-+-+-+-+-+-+-+-+-+-+-+-+-+-+-+-+-+-+-+-+-+-+-+-+-+-+
       |       Length        | Class-Num |  C-Type  |
       +-+-+-+-+-+-+-+-+-+-+-+-+-+-+-+-+-+-+-+-+-+-+-+-+-+-+-+-+
       | ODU Type |    TPN    |     Reserved     |
       +-+-+-+-+-+-+-+-+-+-+-+-+-+-+-+-+-+-+-+-+-+-+-+-+-+-+-+-+
```

FIG. 13

METHOD, APPARATUS, AND SYSTEM FOR ASSIGNING TRIBUTARY PORT NUMBER

CROSS-REFERENCE TO RELATED APPLICATIONS

This application is a continuation of U.S. patent application Ser. No. 13/435,962, filed on Mar. 30, 2012, which is a continuation of International Application No. PCT/CN2010/077416, filed on Sep. 28, 2010. The International Application claims priority to Chinese Patent Application No. 200910204962.8, filed on Sep. 30, 2009. The afore-mentioned patent applications are hereby incorporated by reference in their entireties.

TECHNICAL FIELD

The present invention relates to the field of communication technologies, and in particular, to a method, an apparatus, and a system for assigning a tributary port number.

BACKGROUND

The optical transport network (Optical Transport Network, OTN in short) technology is a core technology of new-generation transport networks, which includes technical specifications of an electric layer and an optical layer and can implement flexible scheduling and management of large capacity services, and gradually becomes a mainstream technology of backbone transport networks.

At the beginning, the OTN standard (ITU-TG.709) defines 3 OTN containers: an optical channel data unit (Optical Channel Data Unit, ODU in short) 1, an ODU2, and an ODU3, the tributary slot types of which are all 2.5 Gb/s, and the rate levels of the ODU1, the ODU2, and the ODU3 are 2.5 Gb/s, 10 Gb/s, and 40 Gb/s respectively. The ODU1 includes 1 tributary slot, the ODU2 includes 4 tributary slots, and the ODU3 includes 16 tributary slots. The OTN standard is extended on the basis of the original standard to support Ethernet services and other new services and fit in with new application scenarios, and new types of signals are proposed, for example, an ODU0 (with a switching granularity of 1.25 Gb/s) suitable for transmitting low-speed signals, an ODU4 (with a switching granularity of 100 G) suitable for transmitting higher rates, an ODU2e, an ODU3e1, an ODU3e2, and a bandwidth-variable ODUflex.

To multiplex a low-rate ODU to a high-rate ODU for transmitting services, a multiplexing relationship between ODUs is further defined in the OTN standard. According to the multiplexing relationship, the ODUs are sorted into a lower order ODU (Lower Order ODU, LO ODU in short) and a higher order ODU (Higher Order ODU, HO ODU in short). A lower order ODU may be multiplexed into a higher order ODU, and encapsulated as an optical channel transport unit (Optical Channel Transport Unit, OTU in short) which is transmitted on a link. In the process of multiplexing the ODU, a tributary port number (Tributary Port Number, TPN in short) needs to be configured for two adjacent nodes manually in a network management system, so that the lower order ODU is multiplexed into the higher order ODU link, namely, an OTU link between the two adjacent nodes according to the assigned TPN. The TPN is configured manually on each link. Therefore, the TPN configuration involves a huge workload and a high error rate.

SUMMARY

Embodiments of the present invention aim at providing a method, an apparatus, and a system for assigning a tributary port number, in which the tributary port number is obtained automatically to improve the efficiency of assigning the TPN and reduce the error rate of assigning the TPN.

An embodiment of the present invention provides a method for assigning a tributary port number, which includes:

receiving, from a neighboring node, a service path request message including a service type for establishing a service path used to bear a Lower Order Optical Channel Data Unit (ODU) service of the service type;

determining, according to the service path request message, an optical channel transport unit (OTU) link used to bear the Lower Order ODU service;

determining, according to the service type in the service path request message, a free tributary slot resource used to bear the Lower Order ODU service in the OTU link;

assigning a tributary port number to the free tributary slot resource, wherein assigning the tributary port number to the free tributary slot resource comprises: if a multiplex structure identifier (MSI) bytes in the OTU link indicates a service type of the Lower Order ODU service, assigning a tributary port number other than tributary port numbers used by Lower Order ODU services having the same type as the Lower Order ODU service in the OTU link; or if the MSI bytes in the OTU link does not indicate a service type of the Lower Order ODU service, assigning a tributary port number other than tributary port numbers used by all types of Lower Order ODU services in the OTU link; and sending a service path acknowledgment message to the neighboring node, wherein the service path acknowledgment message carries information about the free tributary slot resource and the tributary port number.

An embodiment of the present invention further provides another method for assigning a tributary port number, which includes:

determining an optical channel transport unit (OTU) link which is capable of bearing a Lower Order Optical Channel Data Unit (ODU) service of a service type, determining, according to the service type, a free tributary slot resource used to bear the Lower Order ODU service in the OTU link, and assigning a tributary port number to the free tributary slot resource, wherein assigning the tributary port number to the free tributary slot resource comprises: if a multiplex structure identifier (MSI) bytes in the OTU link indicates a service type of the Lower Order ODU service, assigning a tributary port number other than tributary port numbers used by Lower Order ODU services having the same type as the Lower Order ODU service in the OTU link; or if the MSI bytes in the OTU link does not indicate the service type of the Lower Order ODU service, assigning a tributary port number other than tributary port numbers used by all types of Lower Order ODU services in the OTU link; and sending a service path request message to a neighboring node for establishing a service path used to bear the Lower Order ODU service, wherein the service path request message carries information about the free tributary slot resource and the tributary port number.

An embodiment of the present invention further provides an apparatus for assigning a tributary port number, which includes:

a message receiving module, configured to receive a service path request message including a service type for establishing a service path used to bear a Lower Order Optical Channel Data Unit (ODU) service of the service type from a neighboring node;

an obtaining module, configured to determine, according to the service path request message, an optical channel transport unit (OTU) link used to bear the Lower Order ODU service, determine, according to the service type in the service path request message, a free tributary slot resource used to bear the Lower Order ODU service in the OTU link, and assign a tributary port number to the free tributary slot resource; and an acknowledgment sending module, configured to send a service path acknowledgment message to the neighboring node, wherein the service path acknowledgment message carries information about the free tributary slot resource and the tributary port number;

wherein the obtaining module comprises:

a first obtaining unit, configured to, if a multiplex structure identifier (MSI) bytes in the OTU link indicates a service type of the Lower Order ODU service, assign a tributary port number other than tributary port numbers used by Lower Order ODU services having the same type as the Lower Order ODU service in the OTU link; or a second obtaining unit, configured to, if the MSI bytes in the OTU link does not indicate the service type of the Lower Order ODU service, assign a tributary port number other than tributary port numbers used by all types of Lower Order ODU services in the OTU link.

An embodiment of the present invention further provides an apparatus for assigning a tributary port number, which includes:

an obtaining module, configured to determine an optical channel transport unit (OTU) link which is capable of bearing a Lower Order Optical Channel Data Unit (ODU) service of a service type, determine, according to the service type, a free tributary slot resource used to bear the Lower Order ODU service in the OTU link, and assign a tributary port number to the free tributary slot resource; and a message sending module, configured to send a service path request message to a neighboring node for establishing a service path used to bear the Lower Order ODU service, wherein the service path request message carries information about the free tributary slot resource and the tributary port number;

wherein the obtaining module comprises:

a first obtaining unit, configured to, if a multiplex structure identifier (MSI) bytes in the OTU link indicates a service type of the Lower Order ODU service, assign a tributary port number other than tributary port numbers used by Lower Order ODU services having the same type as the Lower Order ODU service in the OTU link; or a second obtaining unit, configured to, if the MSI bytes in the OTU link does not indicate the service type of the Lower Order ODU service, assign a tributary port number other than tributary port numbers used by all types of Lower Order ODU services in the OTU link.

An embodiment of the present invention further provides a system for assigning a tributary port number, which includes a first apparatus for assigning a tributary port number and a first apparatus for receiving a tributary port number.

The first apparatus for assigning a tributary port number is configured to: receive a service path request message from the first apparatus including a service type for establishing a service path used to bear a Lower Order Optical Channel Data Unit (ODU) service of the service type; determine, according to the service path request message, an optical channel transport unit (OTU) link used to bear the Lower Order ODU service, determine, according to the service type in the service path request message, a free tributary slot resource used to bear the Lower Order ODU service in the OTU link, and assign a tributary port number to the free tributary slot resource, wherein assign the tributary port number to the free tributary slot resource comprises: if a multiplex structure identifier (MSI) bytes in the OTU link indicates a service type of the Lower Order ODU service, assign a tributary port number other than tributary port numbers used by Lower Order ODU services having the same type as the Lower Order ODU service in the OTU link; or if the MSI bytes in the OTU link does not indicate a service type of the Lower Order ODU service, assign a tributary port number other than tributary port numbers used by all types of Lower Order ODU services in the OTU link; and send a service path acknowledgment message to the first apparatus for receiving a tributary port number, wherein the service path acknowledgment message carries information about the free tributary slot resource and the tributary port number.

An embodiment of the present invention further provides a system for assigning a tributary port number, which includes a second apparatus for assigning a tributary port number and a second apparatus for receiving a tributary port number.

The second apparatus for assigning a tributary port number is configured to: determine an optical channel transport unit (OTU) link which is capable of bearing a Lower Order Optical Channel Data Unit (ODU) service of a service type, determine, according to the service type, a free tributary slot resource used to bear the Lower Order ODU service in the OTU link, and assign a tributary port number to the free tributary slot resource, wherein assign the tributary port number to the free tributary slot resource comprises: if a multiplex structure identifier (MSI) bytes in the OTU link indicates a service type of the Lower Order ODU service, assign a tributary port number other than tributary port numbers used by Lower Order ODU services having the same type as the Lower Order ODU service in the OTU link; or if the MSI bytes in the OTU link does not indicate the service type of the Lower Order ODU service, assign a tributary port number other than tributary port numbers used by all types of Lower Order ODU services in the OTU link; and send a service path request message to the second apparatus for establishing a service path used to bear the Lower Order ODU service, wherein the service path request message carries information about the free tributary slot resource and the tributary port number.

In the method, apparatus, and system for assigning a tributary port number provided in the embodiments of the present invention, an OTU link used to bear an ODU service is determined according to a service path request message, and a free tributary slot resource used to bear the ODU service is determined and reserved in the OTU link according to the service type in the service path request message; a tributary port number is assigned to the free tributary slot resource, and a service path acknowledgment message that carries the tributary port number is sent. In this way, the tributary port number is obtained automatically instead of being assigned manually through a network management system. Therefore, the efficiency of assigning the tributary port number is improved. Because the manual operation is avoided, the error rate of assigning the tributary port number is reduced.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

FIG. 12 illustrates a format of an extended label object;

FIG. 13 illustrates a subobject; and

DETAILED DESCRIPTION

The technical solution of the present invention will be clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

Figure 1:
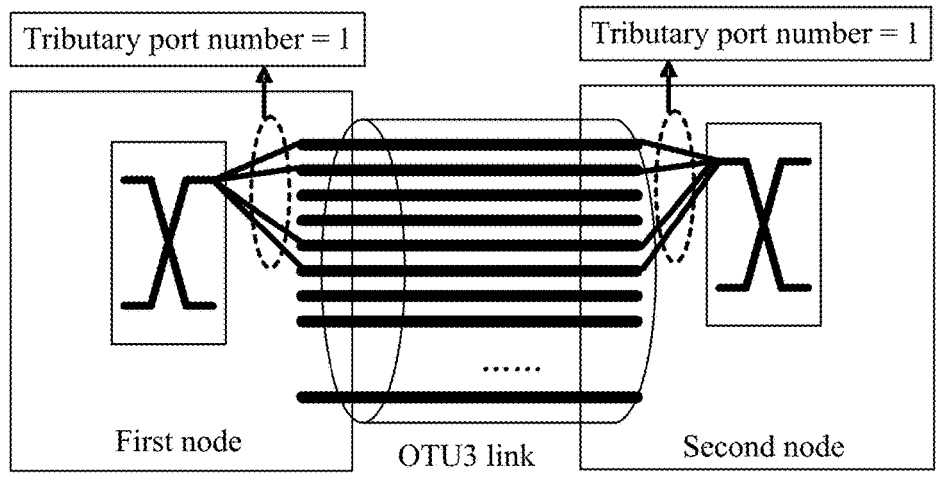
FIG. 1 is a schematic diagram of an OTU link applicable in an embodiment of the present invention.

FIG. 1 is a schematic diagram of an OTU link applicable in an embodiment of the present invention. As shown in FIG. 1, when a service path needs to be established for an ODU service, if the ODU service passes through an OTU link between a first node and a neighboring node of the first node, specifically, in the case of establishing a service path used to transmit an ODU2 service between a service source node and a service destination node, for each segment of the OTU link (for example, an OTU3 link) through which the ODU2 service passes, the first node and a second node at two ends of the segment need to know a tributary port number assigned to the ODU2 service in the OTU3 link before the service path is established. For example, the first node and the second node both know that the tributary port number assigned to the service path of the ODU2 service is 1.

Figure 2:
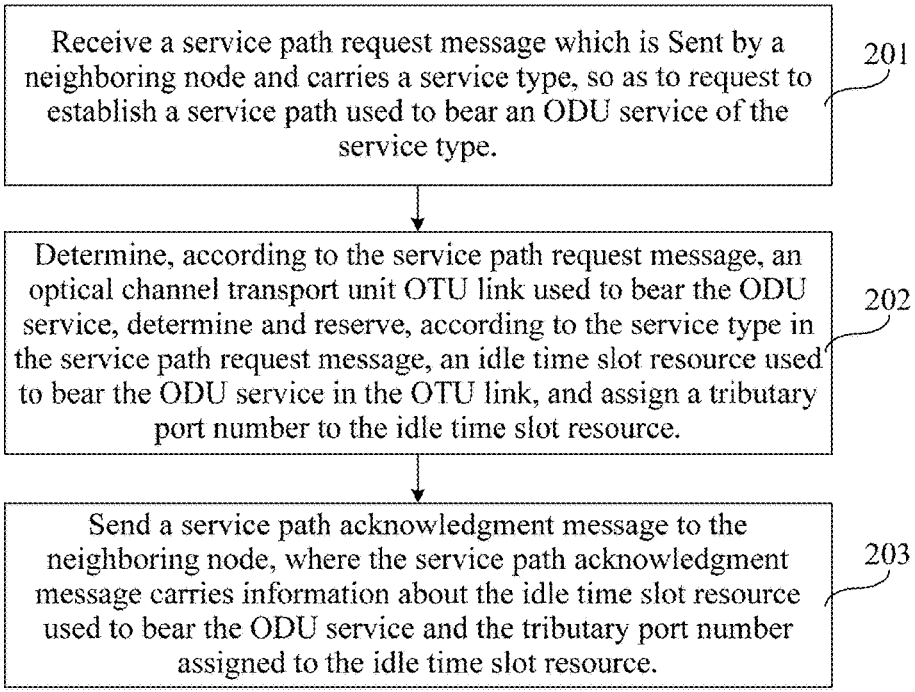
FIG. 2 is a schematic flow chart of a method for assigning a tributary port number according to an embodiment of the present invention.

FIG. 2 is a schematic flow chart of a method for assigning a tributary port number according to an embodiment of the present invention. As shown in FIG. 2, the embodiment of the present invention includes the following steps:

Step 201: Receive a service path request message which is sent by a neighboring node and carries a service type, so as to request to establish a service path used to bear an ODU service of the service type.

Step 202: Determine, according to the service path request message, an optical channel transport unit OTU link used to bear the ODU service, determine and reserve, according to the service type in the service path request message, a free tributary slot resource used to bear the ODU service in the OTU link, and assign a tributary port number to the free tributary slot resource.

Step 203: Send a service path acknowledgment message to the neighboring node, where the service path acknowledgment message carries information about the free tributary slot resource used to bear the ODU service and the tributary port number assigned to the free tributary slot resource.

In this embodiment of the present invention, an entity for performing step 201 to step 203 may be a master node adjacent to the neighboring node. The master node may be a downstream node of the neighboring node. After receiving the service path request message which is sent by the neighboring node and carries the service type, the master node assigns a tributary port number to the requested ODU service, and sends a service path acknowledgment message that carries the tributary port number to the neighboring node so that the neighboring node also obtains the tributary port number of the OTU link used to bear the ODU service.

In the method for assigning a tributary port number in this embodiment of the present invention, an optical channel transport unit OTU link used to bear an ODU service is determined according to a received service path request message, and a free tributary slot resource used to bear the ODU service is determined and reserved in the OTU link according to the service type in the service path request message; a tributary port number is assigned to the free tributary slot resource, and a service path acknowledgment message that carries the tributary port number is sent to the neighboring node. In this way, the tributary port number is assigned automatically instead of being assigned manually through a network management system. Therefore, the efficiency of assigning the tributary port number is improved. Because the manual operation is avoided, the error rate of assigning the tributary port number is reduced.

Figure 3:
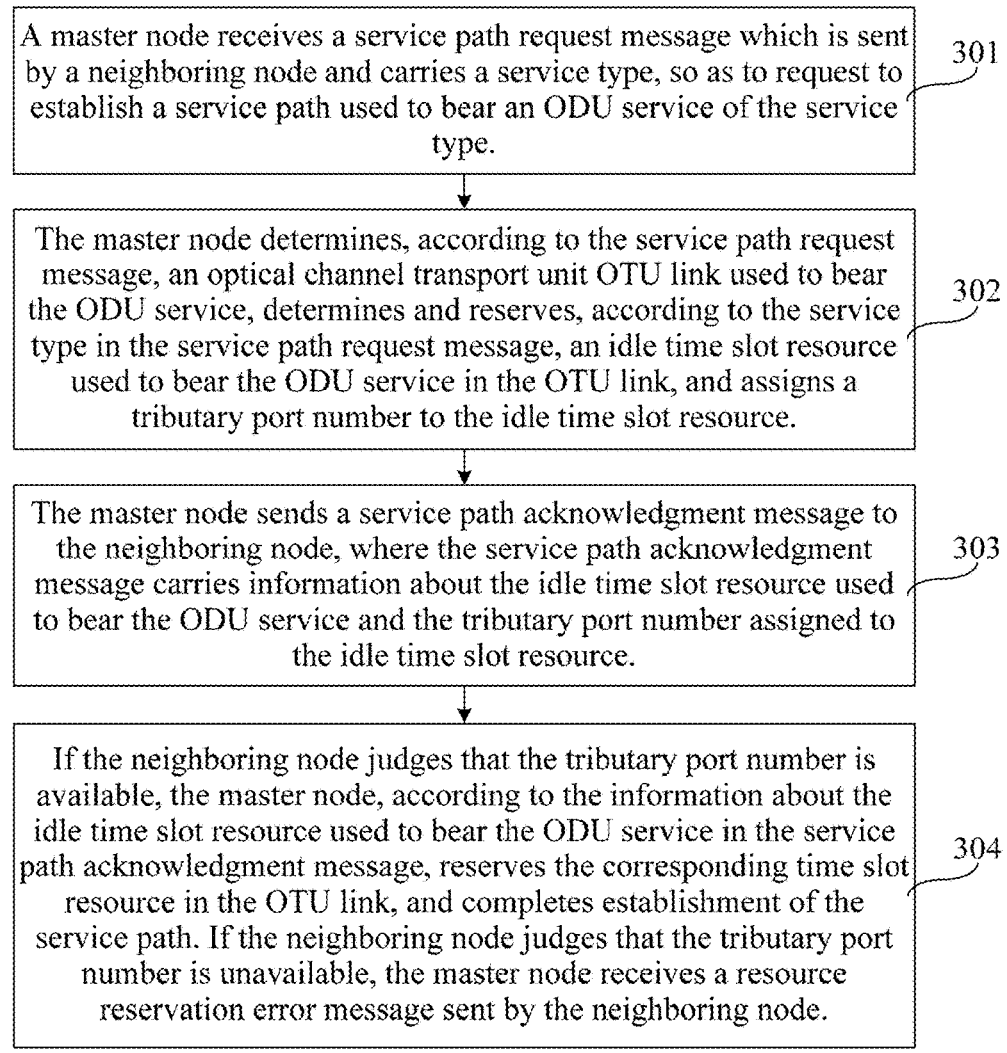
FIG. 3 is a schematic flow chart of a method for assigning a tributary port number according to another embodiment of the present invention.

FIG. 3 is a schematic flow chart of a method for assigning a tributary port number according to another embodiment of the present invention. As shown in FIG. 3, the embodiment of the present invention includes the following steps:

Step 301: A master node receives a service path request message which is sent by a neighboring node and carries a service type, so as to request to establish a service path used to bear an ODU service of the service type.

The master node and the neighboring node may specifically be a downstream node and an upstream node respectively, where the upstream node and the downstream node are only relative concepts. The master node in this embodiment of the present invention may also be an upstream node relative to another node in the OTN link, and the neighboring node may also be a downstream node relative to another node in the OTN link. The master node in this embodiment is a node which is capable of obtaining the tributary port number in the OTN link, and the neighboring node is a node which requests the master node to obtain the tributary port number in the OTN link. Specifically, the service path request message in this embodiment may be a path (Path) message which requests to establish a path and is of a resource reservation protocol-traffic engineering (Resource ReserVation Protocol-Traffic Engineering, RSVP-TE in short) signaling protocol in the generalized multi-protocol label switching (Generalized Multi-Protocol Label Switching, GMPLS in short). It is specified in the service path request message that the service type of the path to be established. For example, if one service path of an ODU2 service needs to be established, the service type needs to be specified as ODU2 in the service path request message.

Step 302: The master node determines, according to the service path request message, an optical channel transport unit OTU link used to bear the ODU service, determines and reserves, according to the service type in the service path request message, a free tributary slot resource used to bear the ODU service in the OTU link, and assigns a tributary port number to the free tributary slot resource.

One or more OTU links may exist between the master node and the neighboring node which are adjacent. Before the tributary slot resource is reserved, the master node needs to select a link used to bear the ODU2 service as an OTU bearing link from at least one OTU link which is capable of bearing the ODU service that possesses this service type. Alternatively, the neighboring node selects the link, and sends the link to the master node through a service path acknowledgment message, and the master node knows the link used to bear the ODU2 service from the service path acknowledgment message.

It is assumed that the master node determines an OTU3 link as an OTU bearing link used to bear the ODU2 service. In the OTN standard, the ODU2 service needs to occupy 4 slots of 16 tributary slots of the OTU3 link. Therefore, the master node needs to select 4 free tributary slots that are in free statuses among the 16 tributary slots to be reserved for the ODU2 service, and assign a tributary port number to the 4 selected tributary slots.

The master node determines and reserves, according to the service type in the service path request message, the free tributary slot resource used to bear the ODU service in the OTU link. Specifically, if the service type in the service path request message is the ODU2 service, the master node obtains a tributary port number used by the service whose service type is also ODU2 and already exists in the OTU3 link. If two ODU2 services already exist in the OTU3 link and the tributary port numbers used by the two ODU2 services are a tributary port number 1 and a tributary port number 2 respectively, the master node assigns a TPN to the new ODU2 service requested by the neighboring node. Because the tributary port number 1 and the tributary port number 2 are already in use, the master node may assign other tributary port numbers that are not used yet, for example, the tributary port number 3 or the tributary port number 4 to the new ODU2 service requested by the neighboring node.

Specifically, the master node may assign a tributary port number to the free tributary slot resource in the following ways:

If the multiplex structure identifier (Multiplex Structure Identifier, MSI in short) bytes in the OTU link can indicate the service type of the ODU service, tributary port numbers used by ODU services having the same type as the ODU service in the OTU link are obtained, and a tributary port number other than the obtained tributary port numbers is assigned to the free tributary slot resource.

If the MSI bytes in the OTU link cannot indicate the service type of the ODU service, the tributary port numbers used by all types of ODU services in the OTU link are obtained, and a tributary port number other than the obtained tributary port numbers is assigned to the free tributary slot resource.

Specifically, in the OTN standard, the MSI bytes in the OTU1 link, the OTU2 link, and the OTU3 link can all indicate the service type of the ODU service. Therefore, for OTU links of such types, the process of assigning a tributary port number is: obtaining the tributary port numbers used by the ODU services which are of the same type and already exist in the OTU link, and assigning a tributary port number other than the obtained tributary port numbers to the free tributary slot resource. By assigning the tributary port number other than the obtained tributary port numbers to the free tributary slot resource, the value of the tributary port number is different from the tributary port numbers used by ODU services which are of the same type and already exist in the link.

For an OTU4 link, because the MSI bytes in the OTU4 link does not indicate the service type of the ODU service, the specific process of assigning a tributary port number to the OTU4 link is: obtaining the tributary port numbers used by the ODU services which are of all types and already exist in the OTU4 link (rather than the ODU services which are of the same type), assigning a tributary port number to the new ODU service requested by the neighboring node, and assigning a tributary port number other than the obtained tributary port numbers to the free tributary slot resource. By assigning the tributary port number other than the obtained tributary port numbers to the free tributary slot resource, the value of the tributary port number is different from those of the tributary port numbers used by the ODU services which are of all types (rather than the ODU services which are of the same type) and already exist in the link.

Step 303: The master node sends a service path acknowledgment message to the neighboring node, where the service path acknowledgment message carries information about the free tributary slot resource used to bear the ODU service and the tributary port number assigned to the free tributary slot resource.

The service path acknowledgment message may specifically be a resource reservation (Resv) message of RSVP-TE in the GMPLS. The Resv message may include a label object, and the label object indicates information about the free tributary slot resource used to bear the ODU service requested to be established. In this embodiment, the label object is extended, which is used for indicating to the neighboring node, which acts as the upstream node, that the master node, which acts as the downstream node, has reserved the selected specific tributary slot in the ODU3, and further indicating the tributary port number assigned by the master node, which acts as the downstream node. Specifically, the format of the extended label object is shown in FIG. 12.

The OD(T)Uk field represents the link type, and specifically, the OD(T)Uk in this embodiment is ODU3; the T field represents the tributary slot type, for example, T=0, which means that the tributary slot type supported by the OTU link is 2.5 G, and T=1, which means that the tributary slot type supported by the OTU link is 1.25 G (certainly, reversed operations may be performed), and in this embodiment, T=0. The Bit Map field means that the bit map mode is applied, and indicates that the downstream node has reserved the specific tributary slot of the OTU3 link for the ODU2 service. The length of the bit map (Bit Map) is determined according to the link type (namely, the ODUk field or the OTUk field) and a tributary slot type (namely, the T field). If the link includes n tributary slots in total (n is a positive integer), the length of the Bit Map is n. The link type in this embodiment is OTU3, and the tributary slot type is 2.5 G. Because the OTU3 link whose tributary slot type is 2.5 G has 16 tributary slots in total, the length of the Bit Map is 16. The TPN field is used for indicating the value of the TPN assigned by the downstream node.

Step 304: If the neighboring node judges that the tributary port number is available, the master node, according to the information about the free tributary slot resource used to bear the ODU service in the service path acknowledgment message, reserves the corresponding tributary slot resource in the OTU link, and completes establishment of the service path. If the neighboring node judges that the tributary port number is unavailable, the master node receives a resource reservation error message sent by the neighboring node.

After receiving the service path acknowledgment message (which may be a Resv message specifically), the neighboring node, which acts as the upstream node, obtains the tributary port number from the service path acknowledgment message, and judges whether the tributary port number is available. If the tributary port number is already used by another ODU2 service in the corresponding link, it represents that the tributary port number is unavailable, and a resource reservation error message (ResvErr message) needs to be sent to the master node, which acts as the downstream node. Optionally, the master node may start over with step 302 to reassign a tributary port number. If not used, it represents that the tributary port number is available, and the neighboring node, according to the reserved tributary slot indicated by the label object in the OTU3 link, reserves the corresponding tributary slot resource in itself, and saves the tributary port number. In this way, the establishment of the service path is completed.

Further, on the basis of the embodiment shown in FIG. 3, the tributary slot assignment may be checked automatically on a transport plane by using the assigned tributary port number, which may specifically include: If the service path is established successfully and the neighboring node multiplexes the ODU service into the reserved tributary slot in the OTU link, the multiplex structure identifier MSI bytes corresponding to the reserved tributary slot is filled with the value of the tributary port number carried in the service path acknowledgment message, and therefore, the master node receives the MSI bytes from the OTU link.

The master node reads the value of the tributary port number in the MSI bytes.

If the read value of the tributary port number is the same as the value of the tributary port number assigned to the free tributary slot resource, the master node receives the ODU service in the reserved tributary slot.

If the read value of the tributary port number is different from the value of the tributary port number assigned to the free tributary slot resource, the master node sends an alarm message to a network management system.

Specifically, the illustration is given by taking an example in which the link service is the ODU2 and the OTU link is the OTU3. If the service path is established successfully, at the beginning of transmitting the ODU2 service, the neighboring node multiplexes the ODU2 service into the reserved tributary slot in the OTU3 link, and fills the MSI bytes corresponding to the reserved tributary slot with the value of the tributary port number. The master node receives the MSI bytes from the OTU3 link, and reads the value of the tributary port number in the MSI bytes corresponding to the tributary slot reserved for the ODU2 service. If the value is the same as the value of the tributary port number assigned by the master node in step 302, it is proved that the connection between the master node and the neighboring node is established correctly, and the master node may receive the ODU2 service from the reserved tributary slot; and if not, an alarm message needs to be sent to the network management system.

The automatic check for the tributary port number assignment on the transport plane prevents conflicts between tributary port numbers generated in the process of assigning the tributary port numbers automatically, and enhances the reliability of assigning the tributary port numbers automatically.

In the method for assigning a tributary port number in this embodiment of the present invention, the master node determines, according to a received service path request message, an optical channel transport unit OTU link used to bear an ODU service, determines and reserves, according to the service type in the service path request message, a free tributary slot resource used to bear the ODU service in the OTU link, and assigns a tributary port number to the free tributary slot resource. Because the tributary port number does not need to be assigned manually through the network management system, the efficiency of assigning the tributary port number is improved. Because the manual operation is avoided, the error rate of assigning the tributary port number is reduced. Moreover, automatic check on the transport plane may also be implemented by using the assigned tributary port number.

Figure 4:
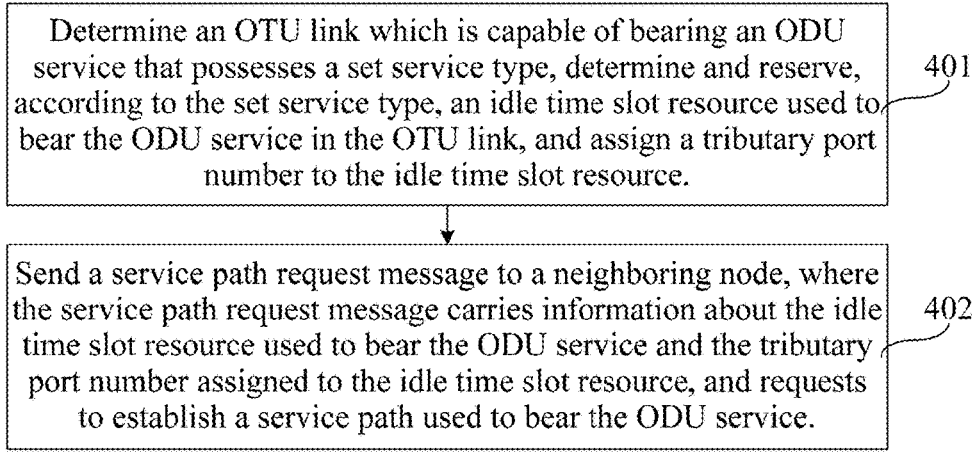
FIG. 4 is a schematic flow chart of a method for assigning a tributary port number according to yet another embodiment of the present invention.

FIG. 4 is a schematic flow chart of a method for assigning a tributary port number according to yet another embodiment of the present invention. As shown in FIG. 4, the embodiment of the present invention includes the following steps:

Step 401: Determine an OTU link which is capable of bearing an ODU service of a set service type, determine and reserve, according to the set service type, a free tributary slot resource used to bear the ODU service in the OTU link, and assign a tributary port number to the free tributary slot resource.

Step 402: Send a service path request message to a neighboring node, where the service path request message carries information about the free tributary slot resource used to bear the ODU service and the tributary port number assigned to the free tributary slot resource, and requests to establish a service path used to bear the ODU service.

In this embodiment of the present invention, an entity for performing step 401 and step 402 may be a master node adjacent to the neighboring node. The master node may be an upstream node of the neighboring node. The master node sends the obtained tributary port number to the neighboring node through a service path request message. Besides, the set service type in this embodiment of the present invention is obtained by the master node through a user request or a network management command, or by receiving a service path request message sent by the neighboring node in the upstream direction of the master node. Certainly, the foregoing three obtaining modes shall not be construed as limitations on the embodiments of the present invention, and any other mode is also appropriate as long as the set service type can be obtained according to practical requirements.

In the method for assigning a tributary port number in this embodiment of the present invention, an OTU link which is capable of bearing an ODU service that possesses the set service type is determined, and a free tributary slot resource used to bear the ODU service is determined and reserved in the OTU link according to the set service type; a tributary port number is assigned to the free tributary slot resource, and a service path request message that carries the tributary port number is sent to the neighboring node. In this way, the tributary port number is assigned automatically instead of being assigned manually through a network management system. Therefore, the efficiency of assigning the tributary port number is improved. Because the manual operation is avoided, the error rate of assigning tributary port number is reduced.

Figure 5:
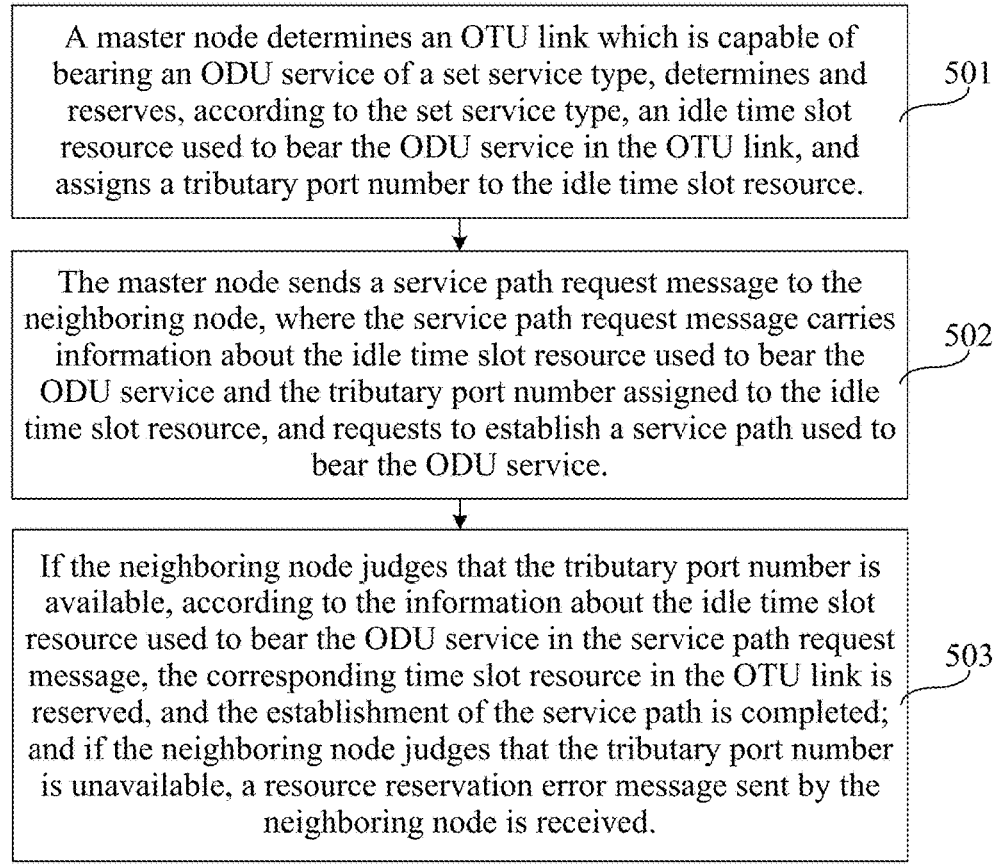
FIG. 5 is a schematic flow chart of a method for assigning a tributary port number according to a further embodiment of the present invention.

FIG. 5 is a schematic flow chart of a method for assigning a tributary port number according to a further embodiment of the present invention. As shown in FIG. 5, the embodiment of the present invention includes the following steps:

Step 501: A master node determines an OTU link which is capable of bearing an ODU service of a set service type, determines and reserves, according to the set service type, a free tributary slot resource used to bear the ODU service in the OTU link, and assigns a tributary port number to the free tributary slot resource.

The master node and a neighboring node may specifically be an upstream node and a downstream node respectively, where the upstream node and the downstream node are relative concepts. The master node in this embodiment of the present invention may also be a downstream node relative to another node in the OTN, and the neighboring node may also be an upstream node relative to another node in the OTN. Besides, the set service type is obtained by the master node through a user request or a network management command, or by receiving a service path request message sent by the neighboring node in the upstream direction of the master node. Certainly, the foregoing three obtaining modes shall not be construed as limitations on the embodiment of the present invention, and any other mode is also appropriate as long as the set service type can be obtained according to practical requirements. In this embodiment, the illustration is given by taking an example in which the set service type is specifically the ODU2 service.

The master node needs to, according to the set service type, determine the link used to bear the ODU service between the master node and the neighboring node, which acts as the downstream node, and determine the free tributary slot used to bear the set service type in the link. For example, the master node, which acts as the upstream node, according to the demand of the set service type, determines one OTU3 link used to bear the ODU2 service. It is assumed that the tributary slot type supported by the OTU3 link is 2.5 G. The master node, which acts as the upstream node, selects 4 free tributary slots that are in free statuses from the 16 tributary slots of the OTU3 link, reserves the free tributary slots for the ODU2 service, and assigns a tributary port number to the 4 selected tributary slots.

The master node may assign a tributary port number to the free tributary slot resource in the following way:

If an MSI bytes in the OTU link can indicate the service type of the ODU service, the tributary port numbers used by ODU services having the same type as the ODU service in the OTU link are obtained, and a tributary port number other than the obtained tributary port numbers is assigned to the free tributary slot resource.

If the MSI bytes in the OTU link cannot indicate the service type of the ODU service, the tributary port numbers used by all types of ODU services in the OTU link are obtained, and a tributary port number other than the obtained tributary port numbers is assigned to the free tributary slot resource.

Specifically, in the OTN standard, the MSI bytes in the OTU3 link can indicate the service type of the ODU service. Therefore, if the service type which is obtained by the master node and already exists in the OTU3 link is also the tributary port number used by the ODU2 service, and if two ODU2 services already exist in the OTU3 link, and the tributary port numbers used by the two ODU2 services are the tributary port number 1 and the tributary port number 2 respectively, the master node assigns a tributary port number to the new ODU2 service. Because the tributary port number 1 and the tributary port number 2 are already used, the master node needs to assign a tributary port number that is not used yet and other than the tributary port number 1 and the tributary port number 2, for example, a tributary port number 3 or a tributary port number 4 to the new ODU2 service.

If the MSI bytes in the OTU link cannot indicate the service type of the ODU service, the process of assigning the tributary port number is slightly different from the foregoing process in that: The master node obtains the tributary port numbers used by the ODU services which are of the same type and already exist in the OTU link, and then assigns a tributary port number to the new ODU service. Because the tributary port number other than the obtained tributary port numbers is assigned to the free tributary slot resource, the value of the tributary port number is different from those of the tributary port numbers used by the ODU services which are of the same type and exist in the link.

Specifically, for an OTU4 link whose set service type is the ODU4 service, the process of assigning a tributary port number is: obtaining, the tributary port numbers used by the ODU services which are of all types (not only the ODU services which are of the same type) and already exist in the OTU4 link, and assigning a TPN to the new ODU service, where the value of the TPN has to be different from the tributary port numbers used by the ODU services which are of all types (not only the ODU services which are of the same type) and already exist in the link.

Step 502: The master node sends a service path request message to the neighboring node, where the service path request message carries information about the free tributary slot resource used to bear the ODU service and the tributary port number assigned to the free tributary slot resource, and requests to establish a service path used to bear the ODU service.

The service path request message sent by the master node, which acts as the upstream node, to the neighboring node, which acts as the downstream node, may specifically be a path (Path) message, and the path message carries a label object. The label object is used for indicating the free tributary slot reserved by the master node and the tributary port number assigned by the master node. The label object may be included in the path message as a sub object of a label set object. The format of the label object is the same as the label described in step 303 in the embodiment shown in FIG. 3, which is no longer described here.

Step 503: If the neighboring node judges that the tributary port number is available, according to the information about the free tributary slot resource used to bear the ODU service in the service path request message, the corresponding tributary slot resource in the OTU link is reserved, and the establishment of the service path is completed; and if the neighboring node judges that the tributary port number is unavailable, a resource reservation error message sent by the neighboring node is received.

After receiving the service path request message (which may be a Path message specifically), the neighboring node, which acts as the downstream node, obtains the tributary port number from the service path request message, and then judges whether the tributary port number is available. If the tributary port number is already used by another ODU2 service in the corresponding link, which represents that the tributary port number is unavailable, a path error message (PathErr message) needs to be sent to the master node, which acts as the upstream node. Optionally, the master node may start over with step 501 to reassign a tributary port number. If not used, which represents that the tributary port number is available, the neighboring node, which acts as the downstream node, according to the reserved tributary slot indicated by the label object in the OTU3 link, where the label object specifically indicates information about the free tributary slot resource that bears the set service type, reserves the corresponding tributary slot resource in itself, saves the tributary port number, and returns a resource reservation message (which may be a Resv message specifically) to the master node to complete establishment of the service path.

In the method for assigning a tributary port number in this embodiment of the present invention, an OTU link used to bear an ODU service that possesses the set service type is determined, and a free tributary slot resource used to bear the ODU service is determined and reserved in the OTU link according to the set service type; a tributary port number is assigned to the free tributary slot resource, and a service path request message that carries the tributary port number is sent to the neighboring node. In this way, the tributary port number is assigned automatically instead of being assigned manually through a network management system. Therefore, the efficiency of assigning the tributary port number is improved. Because the manual operation is avoided, the error rate of assigning the tributary port number is reduced. Moreover, automatic check on a transport plane may also be implemented by using the assigned tributary port number.

Further, on the basis of the embodiment shown in FIG. 5, the tributary slot assignment may be checked automatically on the transport plane by using the assigned tributary port number. The automatic check includes: if the service path is established successfully, multiplexing the ODU service into the reserved tributary slot in the OTU link, and filling the MSI bytes corresponding to the reserved tributary slot with the value of the tributary port number assigned to the free tributary slot resource.

If the value of the tributary port number read by the neighboring node from the MSI bytes is the same as the value of the tributary port number carried in the service path request message received by the neighboring node, the neighboring node receives the ODU service in the reserved tributary slot.

If the value of the tributary port number read by the neighboring node in the MSI bytes is different from the value of the tributary port number carried in the service path request message received by the neighboring node, the neighboring node sends an alarm message to a network management system.

Specifically, the illustration is given by taking an example in which the link service is the ODU2 and the OTU link is the OTU3. If the service path is established successfully, at the beginning of transmitting the ODU2 service, the master node multiplexes the ODU2 service into the reserved tributary slot in the OTU3 link, and fills the MSI bytes corresponding to the reserved tributary slot with the value of the tributary port number assigned in step 501. The neighboring node, which acts as the downstream node, receives data from the OTU3 link, and reads the value of the tributary port number in the MSI bytes corresponding to the tributary slot reserved for the ODU2 service. If the value is the same as the value of the tributary port number carried in the service path request message received by the neighboring node in step 502 to step 503 shown in FIG. 5, it indicates that the service path between the master node and the neighboring node is established correctly, and the neighboring node may receive the ODU2 service in the reserved tributary slot; and if not, an alarm message needs to be sent to the network management system.

The automatic check for the tributary port number assignment on the transport plane prevents conflicts between tributary port numbers generated in the process of assigning the tributary port numbers automatically, and enhances the reliability of assigning the tributary port numbers automatically.

Figure 6:
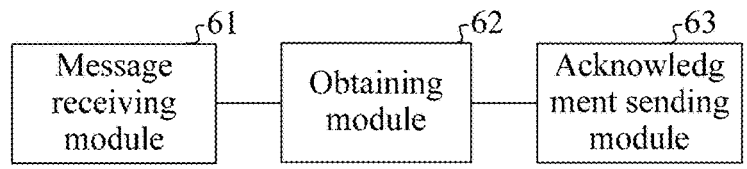
FIG. 6 is a schematic structural diagram of an apparatus for assigning a tributary port number according to an embodiment of the present invention.

FIG. 6 is a schematic structural diagram of an apparatus for assigning a tributary port number according to an embodiment of the present invention. This embodiment of the present invention may implement the method procedures shown in FIG. 2 and FIG. 3. As shown in FIG. 6, the embodiment of the present invention includes a message receiving module 61, an obtaining module 62, and an acknowledgment sending module 63.

The message receiving module 61 is configured to receive a service path request message which is sent by a neighboring node and carries a service type, so as to request to establish a service path used to bear an optical channel data unit ODU service of the service type. The obtaining module 62 is configured to determine, according to the service path request message received by the message receiving module 61, an optical channel transport unit OTU link used to bear the ODU service, determine and reserve, according to the service type in the service path request message, a free tributary slot resource used to bear the ODU service in the OTU link, and assign a tributary port number to the free tributary slot resource. The acknowledgment sending module 63 is configured to send a service path acknowledgment message obtained by the obtaining module 62 to the neighboring node, where the service path acknowledgment message carries information about the free tributary slot resource used to bear the ODU service and the tributary port number assigned to the free tributary slot resource.

In the apparatus for assigning a tributary port number in this embodiment of the present invention, the obtaining module 62 determines, according to a service path request message received by the message receiving module 61, an optical channel transport unit OTU link used to bear an ODU service, determines and reserves, according to the service type in the service path request message, a free tributary slot resource used to bear the ODU service in the OTU link, and assigns a tributary port number to the free tributary slot resource. The acknowledgment sending module 63 sends a service path acknowledgment message which is obtained by the obtaining module 62 and carries the tributary port number to the neighboring node. In this way, the tributary port number is assigned automatically instead of being assigned manually through a network management system. Therefore, the efficiency of assigning the tributary port number is improved. Because the manual operation is avoided, the error rate of assigning the tributary port number is reduced.

Figure 7:
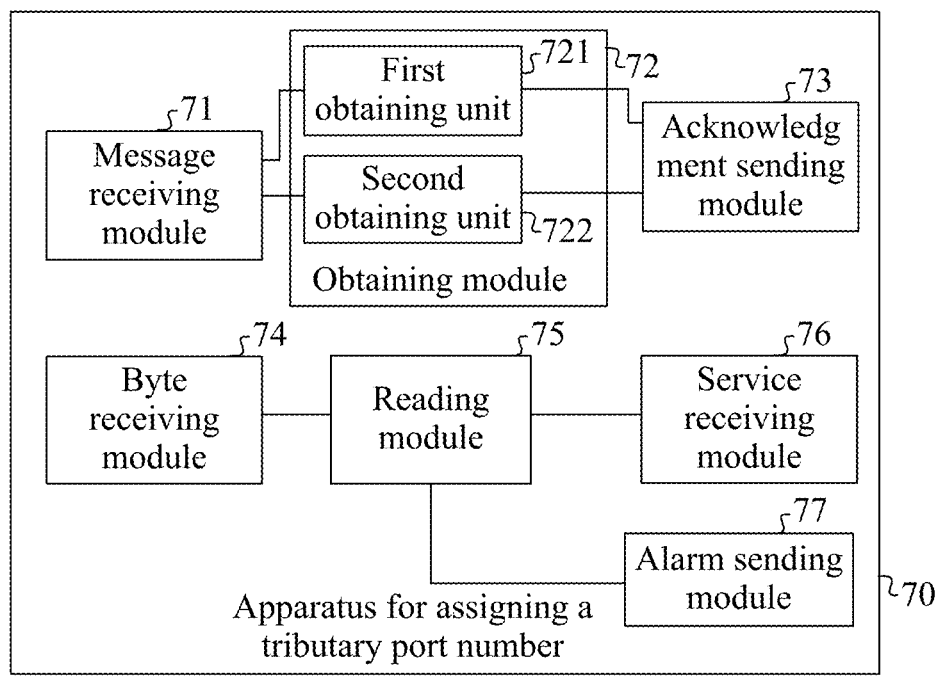
FIG. 7 is a schematic structural diagram of an apparatus for assigning a tributary port number according to another embodiment of the present invention.

FIG. 7 is a schematic structural diagram of an apparatus for assigning a tributary port number according to another embodiment of the present invention. This embodiment of the present invention may implement the method procedures shown in FIG. 2 and FIG. 3. As shown in FIG. 7, the embodiment of the present invention includes a message receiving module 71, an obtaining module 72, an acknowledgment sending module 73, a byte receiving module 74, a reading module 75, a service receiving module 76, and alarm sending module 77.

The message receiving module 71 is configured to receive a service path request message which is sent by a neighboring node and carries a service type, so as to request to establish a service path used to bear an optical channel data unit ODU service of the service type. The obtaining module 72 is configured to determine, according to the service path request message received by the message receiving module 71, an optical channel transport unit OTU link used to bear the ODU service, determine and reserve, according to the service type in the service path request message, a free tributary slot resource used to bear the ODU service in the OTU link, and assign a tributary port number to the free tributary slot resource. The acknowledgment sending module 73 is configured to send a service path acknowledgment message obtained by the obtaining module 72 to the neighboring node, where the service path acknowledgment message carries information about the free tributary slot resource used to bear the ODU service and the tributary port number assigned to the free tributary slot resource.

If the neighboring node judges that the tributary port number is available, the neighboring node, according to the information about the free tributary slot resource used to bear the ODU service in the service path acknowledgment message, reserves the corresponding tributary slot resource in the OTU link, and completes establishment of the service path. If the neighboring node judges that the tributary port number is unavailable, the message receiving module 71 receives a resource reservation error message sent by the neighboring node.

Further, the obtaining module 72 may further include a first obtaining unit 721 and/or a second obtaining unit 722. If a multiplex structure identifier MSI bytes in the OTU link can indicate the service type of the ODU service, the first obtaining unit 721 obtains the tributary port numbers used by ODU services having the same type as the ODU service in the OTU link, and assigns a tributary port number other than the obtained tributary port numbers to the free tributary slot resource. If the MSI bytes in the OTU link cannot indicate the service type of the ODU service, the second obtaining unit 722 obtains the tributary port numbers used by all types of ODU services in the OTU link, and assigns a tributary port number other than the obtained tributary port numbers to the free tributary slot resource.

If the service path is established successfully and the neighboring node multiplexes the ODU service into the reserved tributary slot in the OTU link, the multiplex structure identifier MSI bytes corresponding to the reserved tributary slot is filled with the value of the tributary port number carried in the service path acknowledgment message, and therefore, the byte receiving module 74 receives the MSI bytes from the OTU link, and the reading module 75 reads the value of the tributary port number in the MSI bytes received by the byte receiving module 74. If the read value of the tributary port number is the same as the value of the tributary port number assigned to the free tributary slot resource, the service receiving module 76 receives the ODU service in the reserved tributary slot; and if the read value of the tributary port number is different from the value of the tributary port number assigned to the free tributary slot resource, the alarm sending module 77 sends an alarm message to the network management system.

In the apparatus for assigning a tributary port number in this embodiment of the present invention, the obtaining module 72 determines, according to a service path request message received by the message receiving module 71, an optical channel transport unit OTU link used to bear an ODU service, determines and reserves, according to the service type in the service path request message, a free tributary slot resource used to bear the ODU service in the OTU link, and assigns a tributary port number to the free tributary slot resource. The acknowledgment sending module 73 sends a service path acknowledgment message that carries the tributary port number obtained by the obtaining module 72 to the neighboring node. In this way, the tributary port number is obtained automatically instead of being assigned manually through a network management system. Therefore, the efficiency of assigning the tributary port number is improved. Because the manual operation is avoided, the error rate of assigning the tributary port number is reduced. Moreover, automatic check on a transport plane may be implemented by using the assigned tributary port number.

Figure 8:
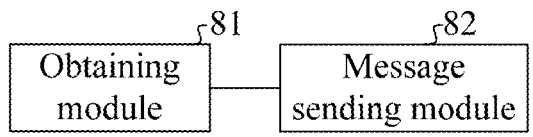
FIG. 8 is a schematic structural diagram of an apparatus for assigning a tributary port number according to yet another embodiment of the present invention.

FIG. 8 is a schematic structural diagram of an apparatus for assigning a tributary port number according to yet another embodiment of the present invention. This embodiment of the present invention may implement the method procedures shown in FIG. 4 and FIG. 5. As shown in FIG. 8, the embodiment of the present invention includes an obtaining module 81 and a message sending module 82.

The obtaining module 81 is configured to determine an OTU link which is capable of bearing an ODU service of a set service type, determine and reserve, according to the set service type, a free tributary slot resource used to bear the ODU service in the OTU link, and assign a tributary port number to the free tributary slot resource. The message sending module 82 is configured to send a service path request message to a neighboring node, where the service path request message carries information about the free tributary slot resource which is obtained by the obtaining module 81 and is used to bear the ODU service and the tributary port number assigned to the free tributary slot resource, and requests to establish a service path used to bear the ODU service.

In the apparatus for assigning a tributary port number in this embodiment of the present invention, the obtaining module 81 determines an OTU link which is capable of bearing an ODU service that possesses the set service type, determines and reserves, according to the set service type, a free tributary slot resource used to bear the ODU service in the OTU link, and assigns a tributary port number to the free tributary slot resource. The message sending module 82 sends a service path request message which is obtained by the obtaining module 81 and carries the tributary port number to the neighboring node. In this way, the tributary port number is obtained automatically instead of being assigned manually through a network management system. Therefore, the efficiency of assigning the tributary port number is improved. Because the manual operation is avoided, the error rate of assigning the tributary port number is reduced. Moreover, automatic check on the transport plane may be implemented by using the assigned tributary port number.

Figure 9:
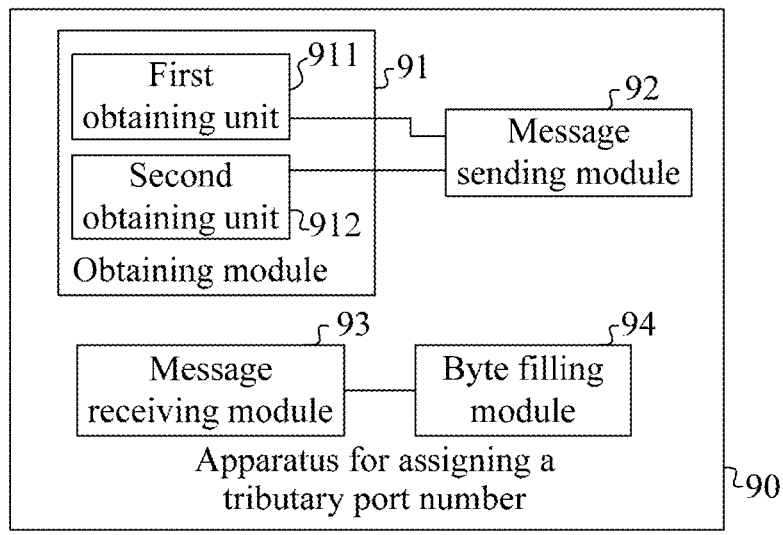
FIG. 9 is a schematic structural diagram of an apparatus for assigning a tributary port number according to a further embodiment of the present invention.

FIG. 9 shows a schematic structure of an apparatus for assigning a tributary port number according to a further embodiment of the present invention. This embodiment of the present invention may implement the method procedures shown in FIG. 4 and FIG. 5. As shown in FIG. 9, the apparatus for assigning a tributary port number 90 in this embodiment of the present invention includes an obtaining module 91, a message sending module 92, a message receiving module 93, and a byte filling module 94.

The obtaining module 91 is configured to determine an OTU link which is capable of bearing an ODU service of a set service type, determine and reserve, according to the set service type, a free tributary slot resource used to bear the ODU service in the OTU link, and assign a tributary port number to the free tributary slot resource. The message sending module 92 is configured to send a service path request message to a neighboring node, where the service path request message carries information about the free tributary slot resource which is obtained by the obtaining module 91 and used to bear the ODU service and the tributary port number assigned to the free tributary slot resource, and requests to establish a service path used to bear the ODU service.

Further, if the neighboring node judges that the tributary port number is available, the neighboring node, according to the information about the free tributary slot resource used to bear the ODU service in the service path request message, reserves the corresponding tributary slot resource in the OTU link, and completes establishment of the service path. If the neighboring node judges that the tributary port number is unavailable, the message receiving module 93 receives a resource reservation error message sent by the neighboring node.

Further, the obtaining module 91 may further include: a first obtaining unit 911 and/or a second obtaining unit 912. If an multiplex structure identifier MSI bytes in the OTU link can indicate the service type of the ODU service, the first obtaining unit 911 obtains the tributary port numbers used by ODU services having the same type as the ODU service in the OTU link, and assigns a tributary port number other than the obtained tributary port numbers to the free tributary slot resource. If the MSI bytes in the OTU link cannot indicate the service type of the ODU service, the second obtaining unit 912 obtains the tributary port numbers used by all types of ODU services in the OTU link, and assigns a tributary port number other than the obtained tributary port numbers to the free tributary slot resource.

Further, if the service path is established successfully, the byte filling module 94 multiplexes the ODU service into the reserved tributary slot in the OTU link, and fills the MSI bytes corresponding to the reserved tributary slot with the value of the tributary port number assigned to the free tributary slot resource.

In the apparatus for assigning a tributary port number in this embodiment of the present invention, the obtaining module 91 determines an OTU link which is capable of bearing an ODU service that possesses the set service type, determines and reserves, according to the set service type, a free tributary slot resource used to bear the ODU service in the OTU link, and assigns a tributary port number to the free tributary slot resource. The message sending module 92 sends a service path request message which is obtained by the obtaining module 91 and carries the tributary port number to the neighboring node. In this way, the tributary port number is obtained automatically instead of being assigned manually through a network management system. Therefore, the efficiency of assigning the tributary port number is improved. Because the manual operation is avoided, the error rate of assigning the tributary port number is reduced. Moreover, automatic check on a transport plane may be implemented by using the assigned TPN.

Figure 10:
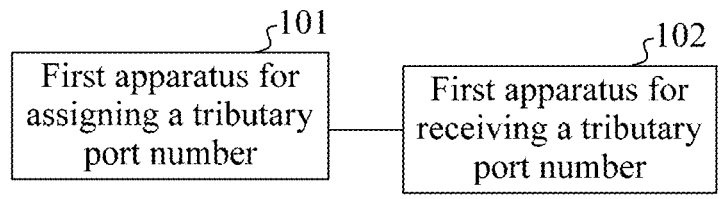
FIG. 10 is a schematic structural diagram of a system for assigning a tributary port number according to an embodiment of the present invention.

FIG. 10 is a schematic structural diagram of a system for assigning a tributary port number according to an embodiment of the present invention. As shown in FIG. 10, the embodiment includes a first apparatus for as a tributary port number 101 and a first apparatus for receiving a tributary port number 102.

The first apparatus for assigning a tributary port number 101 is configured to: receive a service path request message which is sent by a first apparatus for receiving a tributary port number and carries a service type, so as to request to establish a service path used to bear an optical channel data unit ODU service of the service type; determine, according to the service path request message, an optical channel transport unit OTU link used to bear the ODU service, determine and reserve, according to the service type in the service path request message, a free tributary slot resource used to bear the ODU service in the OTU link, and assign a tributary port number to the free tributary slot resource; and send a service path acknowledgment message to the first apparatus for receiving a tributary port number 102, where the service path acknowledgment message carries information about the free tributary slot resource used to bear the ODU service and the tributary port number assigned to the free tributary slot resource.

In this embodiment of the present invention, the first apparatus for assigning a tributary port number 101 may be a master node adjacent to the first apparatus for receiving a tributary port number 102, and the master node may be a downstream node of the first apparatus for receiving a tributary port number 102.

In the system for assigning a tributary port number in this embodiment of the present invention, the first apparatus for assigning a tributary port number 101 determines, according to a service path request message, an OTU link used to bear the service type, determines, according to the service type in the service path request message, a free tributary slot resource used to bear the service type in the OTU link, assigns a tributary port number to the free tributary slot resource, and sends a service path acknowledgment message to the first apparatus for receiving a tributary port number 102. In this way, the tributary port number is assigned automatically instead of being assigned manually through a network management system. Therefore, the efficiency of assigning the tributary port number is improved. Because the manual operation is avoided, the error rate of assigning the tributary port number is reduced.

Figure 11:
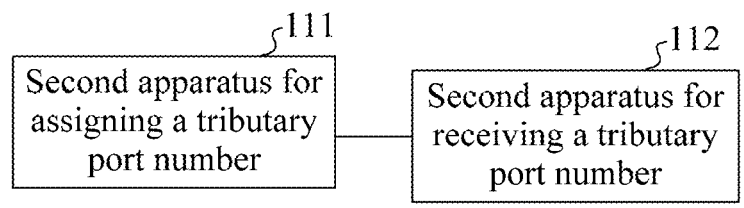
FIG. 11 is a schematic structural diagram of a system for assigning a tributary port number according to another embodiment of the present invention.

FIG. 11 is a schematic structural diagram of a system for assigning a tributary port number according to another embodiment of the present invention. As shown in FIG. 11, the embodiment includes a second apparatus for assigning a tributary port number 111 and a second apparatus for receiving a tributary port number 112.

The second apparatus for assigning a tributary port number 111 is configured to: determine an OTU link which is capable of bearing an ODU service of a set service type, determine and reserve, according to the set service type, a free tributary slot resource used to bear the ODU service in the OTU link, and assign a tributary port number to the free tributary slot resource. The second apparatus for receiving a tributary port number 112 sends a service path request message, where the service path request message carries information about the free tributary slot resource used to bear the ODU service and the tributary port number assigned to the free tributary slot resource, and requests to establish a service path used to bear the ODU service.

In this embodiment of the present invention, the second apparatus for assigning a tributary port number 111 may be a master node adjacent to the second apparatus for receiving a tributary port number 112, and the master node may be an upstream node of the second apparatus for receiving a tributary port number 112.

In the system for assigning a tributary port number in this embodiment of the present invention, the second apparatus for assigning a tributary port number 111 determines an OTU link which is capable of bearing the set service type, determines, according to the set service type, a free tributary slot resource used to bear the service type in the OTU link, assigns a tributary port number to the free tributary slot resource, and sends the tributary port number to the second apparatus for receiving a tributary port number 112 through a service path request messages. In this way, the tributary port number is assigned automatically instead of being assigned manually through a network management system. Therefore, the efficiency of assigning the tributary port number is improved. Because the manual operation is avoided, the error rate of assigning the tributary port number is reduced.

In the embodiments of the present invention, besides the label format in the existing RSVP-TE signaling protocol may be extended to transmit the tributary port number, an <RSVP HOP> object in the Path message or Resv message in the RSVP-TE may be used to carry the tributary port number. Alternatively, a new tributary port number object is directly added in the <flow descriptor list> object of the Path message or Resv message to carry the tributary port number.

Specifically, the illustration is given by taking an example of a Path message and a Resv message in the existing RSVP-TE. The formats of the Path message and the Resv in the existing RSVP-TE are as follows:

```
<Path Message> ::= <Common Header> [ <INTEGRITY> ]
    [ [<MESSAGE_ID_ACK> | <MESSAGE_ID_NACK>] . . . ]
    [ <MESSAGE_ID> ]
    <SESSION> <RSVP_HOP>
    <TIME_VALUES>
    [ <EXPLICIT_ROUTE> ]
    <LABEL_REQUEST>
    [ <PROTECTION> ]
    [ <LABEL_SET> . . . ]
    [ <SESSION_ATTRIBUTE> ]
    [ <NOTIFY_REQUEST> ]
    [ <ADMIN_STATUS> ]
    [ <POLICY_DATA> . . . ]
    <sender descriptor>
<Resv Message> ::= <Common Header> [ <INTEGRITY> ]
    [ [<MESSAGE_ID_ACK> | <MESSAGE_ID_NACK>] . . . ]
    [ <MESSAGE ID> ]
    <SESSION> <RSVP_HOP>
    <TIME_VALUES>
    [ <RESV_CONFIRM> ] [ <SCOPE> ]
    [ <NOTIFY_REQUEST> ]
    [ <ADMIN_STATUS> ]
    [ <POLICY_DATA> . . . ]
    <STYLE> <flow descriptor list>
```

"< >" indicates an object in the message; "[ ]" means that the content in it is optional; "<xx> . . . " means that one message may include multiple objects of a type xx; and the <flow descriptor list> object in the Resv message includes multiple subobjects.

Further, a subobject (a tributary port number subobject, namely, a TPN subobject) may be added in the <PSV-P_HOP> object in the Path message or Resv message in the existing RSVP-TE, and is defined as shown in FIG. 13.

Length represents the length of the object, and Class-Num and C-Type indicate the type of the object. In this embodiment of the present invention, any unused values of Class-Num and C-Type may be used to indicate that the object is a TPN object, for example, Class-Num=10, and C-Type=1. The TPN field indicates the value of the TPN assigned by the node. Optionally, the object may also include an ODU type field to indicate the type of the ODU service to be established; and Reserved is a reserved field, which is not needed in the embodiment of the present invention and reserved for use in future extension.

Figure 14:
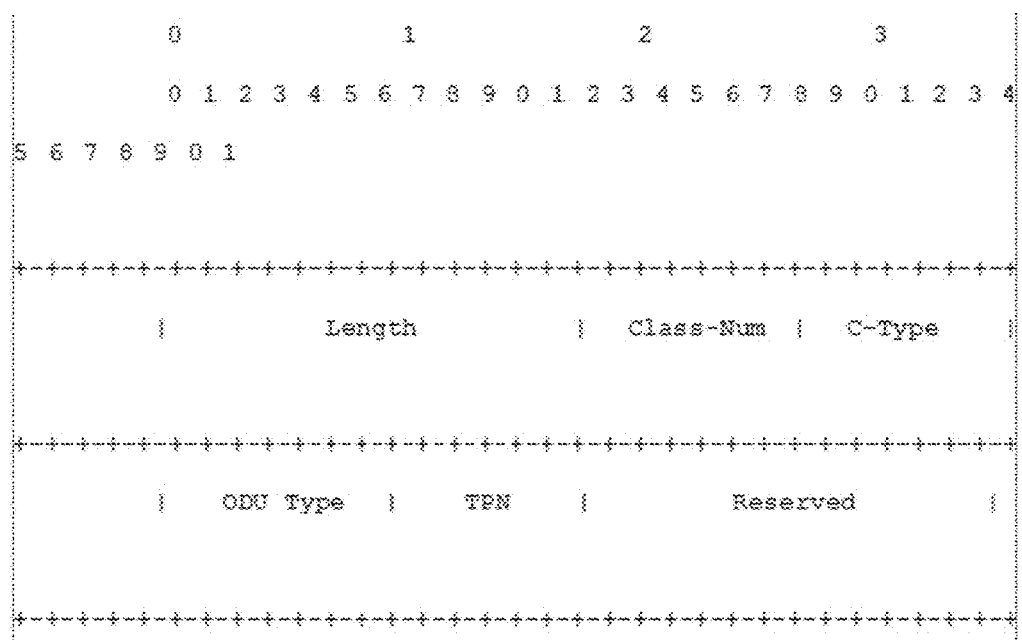
FIG. 14 illustrates another object.

Alternatively, an object (a tributary port number object, namely, a TPN object) is added directly in the Path message or Resv message in the existing RSVP-TE, and is defined as shown in FIG. 14.

The fields of this TPN object have similar definitions with the fields of the TPN sub object described in the foregoing, which are no longer described here.

Those of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a ROM, a RAM, a magnetic disk, and an optical disk.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the spirit and scope of the present invention.

What is claimed is:

1. A method for assigning a tributary port number, the method comprising:
   receiving, from a neighboring node, a service path request message including a service type for establishing a service path used to bear a Lower Order Optical Channel Data Unit (ODU) service of the service type;
   determining, according to the service path request message, an optical channel transport unit (OTU) link used to bear the Lower Order ODU service;
   determining, according to the service type in the service path request message, a free tributary slot resource used to bear the Lower Order ODU service in the OTU link;
   assigning a tributary port number to the free tributary slot resource, wherein assigning the tributary port number to the free tributary slot resource comprises:
     if a multiplex structure identifier (MSI) in the OTU link indicates a service type of the Lower Order ODU service, assigning a tributary port number other than tributary port numbers used by Lower Order ODU services having the same type as the Lower Order ODU service in the OTU link, or
     if the MSI in the OTU link does not indicate a service type of the Lower Order ODU service, assigning a tributary port number other than tributary port numbers used by all types of Lower Order ODU services in the OTU link; and
   sending a service path acknowledgment message to the neighboring node, wherein the service path acknowledgment message carries information about the free tributary slot resource and the tributary port number.

2. The method according to claim 1, wherein after sending the service path acknowledgment message to the neighboring node, the method further comprises:
- if the neighboring node determines that the tributary port number is available, according to the information about the free tributary slot resource in the service path acknowledgment message, reserving a corresponding tributary slot resource in the OTU link; and
- if the neighboring node determines that the tributary port number is unavailable, sending a resource reservation error message by the neighboring node.

3. The method according to claim 1, further comprising:
- receiving the MSI from the OTU link;
- reading the value of the tributary port number in the MSI;
- if the read value of the tributary port number is the same as the value of the tributary port number assigned to the free tributary slot resource, receiving the Lower Order ODU service in a reserved tributary slot; and
- if the read value of the tributary port number is different from the value of the tributary port number assigned to the free tributary slot resource, sending an alarm message to a network management system.

4. A method for assigning a tributary port number, the method comprising:
- determining an optical channel transport unit (OTU) link which is capable of bearing a Lower Order Optical Channel Data Unit (ODU) service of a service type, determining, according to the service type, a free tributary slot resource used to bear the Lower Order ODU service in the OTU link, and assigning a tributary port number to the free tributary slot resource, wherein assigning the tributary port number to the free tributary slot resource comprises:
  - if a multiplex structure identifier (MSI) in the OTU link indicates a service type of the Lower Order ODU service, assigning a tributary port number other than tributary port numbers used by Lower Order ODU services having the same type as the Lower Order ODU service in the OTU link, or
  - if the MSI in the OTU link does not indicate the service type of the Lower Order ODU service, assigning a tributary port number other than tributary port numbers used by all types of Lower Order ODU services in the OTU link; and
- sending a service path request message to a neighboring node for establishing a service path used to bear the Lower Order ODU service, wherein the service path request message carries information about the free tributary slot resource and the tributary port number.

5. The method according to claim 4, wherein after sending the service path request message to the neighboring node, the method further comprises:
- if the neighboring node determines that the tributary port number is available, reserving a corresponding tributary slot resource in the OTU link according to the infounation about the free tributary slot resource in the service path request message; or
- if the neighboring node determines that the tributary port number is unavailable, sending a resource reservation error message by the neighboring node.

6. The method according to claim 4, further comprising:
- multiplexing the Lower Order ODU service into the reserved tributary slot in the OTU link and filling the MSI corresponding to the reserved tributary slot with a value of the tributary port number;
- if a value of the tributary port number read by the neighboring node from the MSI is the same as the value of the tributary port number carried in the service path request message received by the neighboring node, receiving, by the neighboring node, the Lower Order ODU service in the reserved tributary slot; and
- if a value of the tributary port number read by the neighboring node from the MSI is different from the value of the tributary port number carried in the service path request message received by the neighboring node, sending an alarm message to a network management system.

7. An apparatus for assigning a tributary port number, the apparatus comprising:
- a message receiving module, configured to receive a service path request message including a service type for establishing a service path used to bear a Lower Order Optical Channel Data Unit (ODU) service of the service type from a neighboring node;
- an obtaining module, configured to determine, according to the service path request message, an optical channel transport unit (OTU) link used to bear the Lower Order ODU service, determine, according to the service type in the service path request message, a free tributary slot resource used to bear the Lower Order ODU service in the OTU link, and assign a tributary port number to the free tributary slot resource;
- an acknowledgment sending module, configured to send a service path acknowledgment message to the neighboring node, wherein the service path acknowledgment message carries information about the free tributary slot resource and the tributary port number; and
- wherein the obtaining module comprises:
  - a first obtaining unit, configured to, if a multiplex structure identifier (MSI) bytes in the OTU link indicates a service type of the Lower Order ODU service, assign a tributary port number other than tributary port numbers used by Lower Order ODU services having the same type as the Lower Order ODU service in the OTU link, or
  - a second obtaining unit, configured to, if the MSI bytes in the OTU link does not indicate the service type of the Lower Order ODU service, assign a tributary port number other than tributary port numbers used by all types of Lower Order ODU services in the OTU link.

8. The apparatus according to claim 7, wherein the message receiving module is further configured to, if the neighboring node determines that the tributary port number is unavailable, receive a resource reservation error message sent by the neighboring node.

9. The apparatus according to claim 7, further comprising:
- a byte receiving module, configured to receive the MSI from the OTU link;
- a reading module, configured to read the value of the tributary port number from the MSI;
- a service receiving module, configured to, if the read value of the tributary port number is the same as the value of the tributary port number assigned to the free tributary slot resource, receive the Lower Order ODU service in the reserved tributary slot; and
- an alarm sending module, configured to, if the read value of the tributary port number is different from the value of the tributary port number assigned to the free tributary slot resource, send an alarm message to a network management system.

10. An apparatus for assigning a tributary port number, the apparatus comprising:

an obtaining module, configured to determine an optical channel transport unit (OTU) link which is capable of bearing a Lower Order Optical Channel Data Unit (ODU) service of a service type, determine, according to the service type, a free tributary slot resource used to bear the Lower Order ODU service in the OTU link, and assign a tributary port number to the free tributary slot resource;

a message sending module, configured to send a service path request message to a neighboring node for establishing a service path used to bear the Lower Order ODU service, wherein the service path request message carries information about the free tributary slot resource and the tributary port number; and wherein the obtaining module comprises:
  a first obtaining unit, configured to, if a multiplex structure identifier (MSI) in the OTU link indicates a service type of the Lower Order ODU service, assign a tributary port number other than tributary port numbers used by Lower Order ODU services having the same type as the Lower Order ODU service in the OTU link, or
  a second obtaining unit, configured to, if the MSI in the OTU link does not indicate the service type of the Lower Order ODU service, assign a tributary port number other than tributary port numbers used by all types of Lower Order ODU services in the OTU link.

11. The apparatus according to claim 10, further comprising:
  a message receiving module, configured to, if the neighboring node determines that the tributary port number is unavailable, receive a resource reservation error message sent by the neighboring node.

12. The apparatus according to claim 10, further comprising:
  a byte filling module, configured to, if the service path is established successfully, multiplex the Lower Order ODU service into the reserved tributary slot in the OTU link and fill the MSI corresponding to the reserved tributary slot with a value of the tributary port number assigned to the free tributary slot resource.

13. A system for assigning a tributary port number, the system comprising:
  a first apparatus for receiving a tributary port number; and
  a second apparatus for assigning a tributary port number and configured to:
    receive a service path request message from the first apparatus including a service type for establishing a service path used to bear a Lower Order Optical Channel Data Unit (ODU) service of the service type,
    determine, according to the service path request message, an optical channel transport unit (OTU) link used to bear the Lower Order ODU service,
    determine, according to the service type in the service path request message, a free tributary slot resource used to bear the Lower Order ODU service in the OTU link, and
    assign a tributary port number to the free tributary slot resource, wherein assign the tributary port number to the free tributary slot resource comprises:
      if a multiplex structure identifier (MSI) in the OTU link indicates a service type of the Lower Order ODU service, assign a tributary port number other than tributary port numbers used by Lower Order ODU services having the same type as the Lower Order ODU service in the OTU link; or
      if the MSI in the OTU link does not indicate a service type of the Lower Order ODU service, assign a tributary port number other than tributary port numbers used by all types of Lower Order ODU services in the OTU link; and
    send a service path acknowledgment message to the first apparatus, wherein the service path acknowledgment message carries information about the free tributary slot resource and the tributary port number.

14. A system for assigning a tributary port number, the system comprising:
  a first apparatus for receiving a tributary port number; and
  a second apparatus for assigning a tributary port number and configured to:
    determine an optical channel transport unit (OTU) link which is capable of bearing a Lower Order Optical Channel Data Unit (ODU) service of a service type,
    determine, according to the service type, a free tributary slot resource used to bear the Lower Order ODU service in the OTU link, and
    assign a tributary port number to the free tributary slot resource, wherein assign the tributary port number to the free tributary slot resource comprises:
      if a multiplex structure identifier (MSI) in the OTU link indicates a service type of the Lower Order ODU service, assign a tributary port number other than tributary port numbers used by Lower Order ODU services having the same type as the Lower Order ODU service in the OTU link; or
      if the MSI in the OTU link does not indicate the service type of the Lower Order ODU service, assign a tributary port number other than tributary port numbers used by all types of Lower Order ODU services in the OTU link; and
    send a service path request message to the first apparatus for establishing a service path used to bear the Lower Order ODU service, wherein the service path request message carries information about the free tributary slot resource and the tributary port number.

* * * * *